United States Patent
Johnson

(10) Patent No.: US 9,738,430 B2
(45) Date of Patent: Aug. 22, 2017

(54) POUCH CONTAINER FOR FOOD PRODUCT

(71) Applicant: Elizabeth Johnson, Swaffham (GB)

(72) Inventor: Elizabeth Johnson, Swaffham (GB)

(73) Assignees: David Severs Lambert, Langland Swansea (GB); Peter James Harding, Ponteland, Newcastle Upon Tyne (GB)

(*) Notice: Subject to any disclaimer, the term of this patent is extended or adjusted under 35 U.S.C. 154(b) by 65 days.

(21) Appl. No.: 14/624,038

(22) Filed: Feb. 17, 2015

(65) Prior Publication Data

US 2016/0009477 A1    Jan. 14, 2016

Related U.S. Application Data

(62) Division of application No. 12/447,538, filed as application No. PCT/GB2007/004136 on Oct. 30, 2007, now abandoned.

(30) Foreign Application Priority Data

| Oct. 30, 2006 | (GB) | 0621546.1 |
| May 18, 2007 | (GB) | 0709503.7 |

(51) Int. Cl.

| B65D 81/34 | (2006.01) |
| A23L 5/10 | (2016.01) |
| B65D 81/32 | (2006.01) |
| B65D 75/00 | (2006.01) |
| B65D 25/04 | (2006.01) |
| B65D 79/00 | (2006.01) |

(52) U.S. Cl.
CPC ............... B65D 81/34 (2013.01); A23L 5/10 (2016.08); B65D 25/04 (2013.01); B65D 75/008 (2013.01);
(Continued)

(58) Field of Classification Search
CPC .. B65D 81/34; B65D 81/343; B65D 81/3446; B65D 81/3453; B65D 81/3461;
(Continued)

(56) References Cited

U.S. PATENT DOCUMENTS 2,753,990 A * 7/1956 Chalfin ............... B65D 1/04
                                                206/221
4,608,043 A * 8/1986 Larkin ............... A61J 1/2093
                                                206/219
(Continued)

FOREIGN PATENT DOCUMENTS

DE    EP 1371578 A2 * 12/2003   ......... B65D 81/3266
FR       2536251 A1 *  5/1984   ........... A23L 1/0008
(Continued)

OTHER PUBLICATIONS

Machine translation of EP1371578 obtained Aug. 12, 2016.*
Machine translation of FR2536251 obtained Aug. 12, 2016.*

Primary Examiner — Viren Thakur
(74) Attorney, Agent, or Firm — Galgano IP Law PLLC; Thomas M. Galgano; Jessica G. McDonald

(57) ABSTRACT

A pouch container (1) for a food product, a filled container, and a method of filling are described. The container (1) comprises a sheet containment material configured surroundingly and sealingly to define a food containment volume, at least one closure seam (7) provided within the volume between paired opposing surfaces of the said sheet containment material to divide the containment volume into two food compartments (8,9) suitable to contain food product in use, wherein the said closure seam (7) has a pressure sensitive apertured portion (14) adapted to be closed at ambient pressure but to open when an internal pressure differential between the compartments reaches a predetermined point.

5 Claims, 6 Drawing Sheets

(52) U.S. Cl.
CPC ....... *B65D 79/005* (2013.01); *B65D 81/3266* (2013.01); *B65D 81/3294* (2013.01); *B65D 81/343* (2013.01); *B65D 81/3415* (2013.01); *A23V 2002/00* (2013.01); *B65D 81/3453* (2013.01); *B65D 81/3461* (2013.01); *B65D 2205/02* (2013.01)

(58) Field of Classification Search
CPC ...... B65D 25/04; B65D 25/08; B65D 25/082; B65D 25/085; B65D 25/087; B65D 81/3211; B65D 81/3266; B65D 75/008; B65D 81/3294; B65D 2581/3425; B65D 2581/3429; B65D 2581/3431; B65D 2581/3432; B65D 81/32; B65D 81/3205; B65D 81/3261; B65D 31/12; B65D 33/2566; B65D 29/02; B65D 33/004; B65D 19/84; B65D 221/9067; B65D 31/14; B65D 31/145; B65D 31/147; B65D 31/142; A23L 5/10; A23L 5/15; A23L 5/17; A23L 5/30; A23L 5/34; A23V 2200/08; Y10S 229/904; A45C 3/001; A45C 7/0086; A45C 7/009
See application file for complete search history.

(56) References Cited

U.S. PATENT DOCUMENTS

| | | | | |
|---|---|---|---|---|
| 4,630,727 A * | 12/1986 | Feriani | ............... | A61J 1/2093 206/221 |
| 4,978,025 A * | 12/1990 | Fougeres | ............... | B65D 31/12 222/105 |
| 4,997,083 A * | 3/1991 | Loretti | ............... | A61J 1/2093 206/219 |
| 6,357,631 B1 * | 3/2002 | Zaksenberg | ....... | B65D 75/5811 222/212 |
| 6,610,338 B2 * | 8/2003 | Tang | ............... | B65D 75/58 383/207 |
| 6,641,882 B1 * | 11/2003 | Shibata | ............... | B29C 66/71 426/112 |
| 6,743,451 B2 * | 6/2004 | Rasile | ............... | B65D 33/2525 206/219 |
| 6,866,145 B2 * | 3/2005 | Richards | ............... | A47L 13/17 206/219 |
| 2004/0065315 A1 * | 4/2004 | Fish | ............... | A61F 7/03 126/263.08 |
| 2004/0065679 A1 * | 4/2004 | Peuker | ............... | B65D 81/3294 222/107 |
| 2004/0118839 A1 * | 6/2004 | Hughes | ............... | B65D 75/008 219/734 |
| 2005/0006404 A1 * | 1/2005 | Harper | ............... | B65D 75/58 222/107 |
| 2005/0079252 A1 * | 4/2005 | Kendig | ............... | B32B 7/02 426/125 |
| 2006/0113212 A1 * | 6/2006 | Steele | ............... | B31B 19/84 206/525 |

FOREIGN PATENT DOCUMENTS

| | | | | |
|---|---|---|---|---|
| JP | 09221150 A | * | 8/1997 | ......... B65D 81/3266 |
| JP | 2002240866 A | * | 8/2002 | |
| JP | 2005350109 A | * | 12/2005 | |

* cited by examiner

POUCH CONTAINER FOR FOOD PRODUCT

CROSS-REFERENCE TO RELATED APPLICATIONS

This application is a divisional application of application Ser. No. 12/447,538, filed Apr. 28, 2009, which is a 371 National Stage application of PCT/GB2007/004136, filed Oct. 30, 2007.

BACKGROUND OF THE INVENTION

The invention relates to a pouch container suitable for containing a food product. The invention especially relates to flexible 'stand up' pouches for the storage and subsequent heating of food product.

Packaging pouches are increasingly widespread for food use, especially in that they offer a convenient and compact dual use solution both as a storage receptacle and as a receptacle for heating of food. Such pouches in particular relate to prepared or partially prepared food product, and in particular to previously raw, partially or completely cooked food, which is sealed in a pouch for storage. Such pouches are especially useful for product that is subsequently reheated prior to use for example in a microwave, in a pan of boiling water, or via any other suitable heat source.

Pouches of this type in particular find application as retortable pouches for room temperature storage of product, where food product, and in particular cooked food product is sealed within a flexible pouch, is then retorted to sterilise the product to allow room temperature storage, and is subsequently reheated for example by boiling in water or in a microwave. However, such technology also finds application in relation to product stored in a chilled or frozen state. Again, food product, and in particular raw or pre-cooked food product, is sealed within a flexible pouch, which is then either kept chilled or frozen to maintain shelf life. In such circumstances, there is no requirement for the pouch to be retorted to sterilise the contents, since preservation is via the chilling or freezing process, but further thermal processing to pasteurise the food may be made in pack to extend shelf life.

However, a broadly similar range of packaging technologies can be employed with pouches that are intended for a retort-based or other heat-based sterilisation treatment and with pouches that are intended for other shelf-life preservation techniques such as freezing, chilling, or the like. Where the term "retortable pouch" is used herein, or where exemplification of the invention is given in the context of such retortable pouches, it is to be understood that such use is intended generally to cover all food product pouch packaging of the basic design that is suitable both for heat-treatment sterilisation processes for room temperature storage and for chilled or frozen storage, pasteurisation or the like. References are to be construed accordingly.

The term "food product" is similarly to be interpreted broadly to cover any ingestible product whether solid, liquid, fluid or combination thereof, although for the reasons below the invention particularly relates to packing for a food product including a solid and a fluid component.

Pouches of the type described suffer from a particular drawback. While they can offer adequate safe shelf life, either through a sterilisation process or through chilled or frozen storage or another suitable preservation process, certain food components cannot be mixed within the pouch without deterioration of eating quality. A number of food products, in particular starchy food products such as rice, pasta, noodles, starchy pulses, vegetables and the like, and also essentially dry food products, are prone to lose texture quite rapidly through liquid absorption if they are kept in a state where there is an excess of liquid. However, most food products involving the likes of pasta, rice, potatoes etc. will necessarily comprise a recipe with a liquid component, such as a sauce or the like in order to be palatable and desirable.

These issues have tended to limit the use of single flexible pouches for such meal products, and instead have tended to favour the use of separate pouches for separate products, or at least to keep the liquid part such as a sauce separate from the starchy part such as pasta, rice or potatoes, or to favour the use of multiple compartment rigid trays. In either instance, the different components are kept separate during storage and are effectively cooked entirely separately.

In an attempt to address this potential limitation of conventional pouches it has been suggested that multiple compartmental pouches may be provided. For example, WOO 1/21506 describes a dual compartment food package for microwave cooking in which an internal pouch contains the fluid substance, and an external carton contains both the internal pouch and dry food substance, with the internal pouch designed to burst during heating.

Such systems are not ideal. In a simple state, they are likely to burst in an uncontrollable manner, and there is possibility of the debris from the burst contaminating the food. If zones of weakness, for example comprising parts that melt or burst preferentially, are built into the packaging, those melt or burst residues can still present a contamination issue. This lack of controllability, and tendency to contamination, arising in such designs has tended to limit their effectiveness and favour designs which are fully separate and compartmentalised keeping liquid components separate from those components where an excess of liquid is undesirable during storage and, in the instance where the containers are dual use as cooking receptacles also, separate during cooking with mixing prior to serving.

BRIEF SUMMARY OF THE INVENTION

It is an object of the invention to mitigate some or all of the above disadvantages.

It is a particular preferred object of the invention to provide a pouch for food product which has dual functionality both as a storage container and as a receptacle for cooking or re-heating of the food product contained therein.

It is a particular object of the invention to provide a pouch for food product which is effective in tending to keep separate generally fluid components and components generally benefiting from being stored in the absence of an excess of liquid during storage but to facilitate their mixing prior to serving for example during cooking/reheating.

Thus, according to the invention there is provided a pouch container for a food product comprising a sheet containment material configured surroundingly and sealingly to define a food containment volume, at least one closure seam provided within the volume between paired opposing surfaces of the said sheet containment material to divide the containment volume into two food compartments suitable to contain food product in use, wherein the said closure seam has a pressure sensitive apertured portion adapted to be closed at ambient pressure but to open when an internal pressure differential between the compartments reaches a predetermined point. For example it is adapted to open when one compartment is retained at ambient pressure and another is at a predetermined pressure greater than ambient pressure.

In particular, the sheet enclosure comprises a pouch defined by a perimeter seal to complete enclosure of the food containment volume, and in particular comprises a first sheet and a second sheet, or an envelope formed of a single folded sheet, mutual edges of which are sealed together to define a food containment volume. The pressure sensitive apertured portion is preferably located in the vicinity of an edge of the pouch so formed.

For example, the mutually opposing sheet surfaces at the closure seam are sealingly bonded together for a major part of the of the seam, for example the upper portion thereof, but are unbonded in an unbonded zone, for example at or toward the lowermost portion relying on the flexible resilience of the sheet material, or are less strongly bonded in a zone of weakness, or are provided with a pressure sensitive valve means, at the pressure sensitive apertured portion.

In accordance with any of these alternatives, the two compartments of the pouch are separate compartments, and food product in those two compartments is kept separate absent any pressure differential between them, for example at ambient pressure, but the food product is able to mix when pressure at the pressure sensitive aperture rises above the pre-determined breach value as a pressure differential between the compartment rises, for example in that one is above ambient In accordance with a preferred embodiment of the invention, a first compartment is designed to contain fluid food product, that is food product that is intended to be fluid at room temperature, or at least fluid at heating and/or serving temperature. It may for example be a sauce-based product or the like. This is not to suggest that the fluid product in the first compartment is intended to consist of fluid or liquid components only. The purpose of the invention is to enable the separation during storage of those food components that necessarily have an excess of fluid, and in particular an excess of water from those food components, in particular starch based food components that deteriorate in quality in the presence of an excess of fluid, and for example an excess of water. It will not therefore depart from the principles of the invention to include as part of the fluid component in the first compartment solid ingredients that do not deteriorate over time to such a degree in the presence of an excess of liquid. In particular, the fluid component is for example a sauce which might include protein-based ingredients such as meat and the like, or other ingredients that do not deteriorate over time when stored as part of a sauce.

A second compartment is a preferred embodiment is designed is to contain food product to be kept separate from the fluid component in the first compartment, and in particular to contain food product which is likely to deteriorate over time if stored in an excess of fluid, and in particular in excess of liquid such as water. For example, the second component might contain rice, pasta or other heavily starched product.

In storage, this is kept separate from the fluid component in that the pressure sensitive apertured portion provides a practically effective seal between the two compartments. This is the case even if during handling some minor ingress of fluid component takes place through the pressure sensitive apertured portion, since the issue is a quality issue, and not a strict food hygiene issue, so an absolute seal is not required, but it is merely sufficient that the quantity of fluid excess in the second compartment is significantly reduced.

For heating/re-heating or otherwise preparing for use and consumption, the second compartment is opened to ambient pressure and preferably has an openable portion, and for example a removable flapped aperture, a kiss cut tear or the like in a manner which will be familiar. This is normal with such pouch containers, where such an opening in the pouch is made prior to cooking to avoid bursting. However, the first apertured portion has no such provision and is not opened prior to cooking. As a result, during heating pressure builds up in the first compartment, for example in the form of steam, until the pressure in the first compartment (and the pressure differential with the second compartment inherently at ambient given that it is open to ambient) exceeds the pre-determined pressure at which the pressure sensitive apertured portion tends to open. Thus, during the cooking process, fluid is driven from compartment one to compartment two by the elevated pressure generated in compartment one (or more specifically by the differential in pressure thus generated at the apertured portion), either by exceeding the pressure required to force open a gap between the sheet faces in the unbonded region of the seam, or by exceeding the pressure necessary to cause failure of the seam in the zone of weakness, or by exceeding the pressure necessary to cause a pressure valve mechanism in the apertured portion to move to an open position as the case may be.

Thus, a single pouch package is provided which is effective in keeping separate a fluid component of a meal product having an excess of fluid, and in particular an excess of liquid such as water, from a non-fluid component of a meal where it is desirable to avoid an excess of fluid, and in particular an excess of liquid such as water, during storage, but which facilitates a transfer of the liquid component to the compartment containing solid component and thereby also mixing of the two components during reheat or other preparation for use. This transfer is capable of being effected automatically merely as an artefact of packaging design and as a consequence of the heating process. It does not always require specific user intervention (although the invention is not so limited as to preclude this where desirable). Unlike some prior art devices, it does not require specific modification of the packaging to ensure that the fluid component film heats more rapidly and thereby ruptures, since the differential pressure system, and the generation of an overpressure in the fluid compartment during heating, is sufficient to produce the required effect. This effect may be augmented when in a microwave if the fluid compartment is located at an outer part of the pouch where it receives more energy. That is to say, the fluid compartment, for example containing a sauce or the like, is not within or surrounded by the non-fluid compartment. Rather, it is adjacent and so exposed directly to incident radiation during microwave cooking and is for example alongside, and preferably at least not above the non-fluid compartment. This arrangement is important as the desire, to achieve the functionality of the present invention, is that the higher fat/liquid content of the fluid component should heat rapidly first. This is achieved optimally only if the fluid compartment is directly exposed to microwave radiation, in that it is alongside the non-fluid compartment and not inside or above it. Fluid passes from the first compartment to the second compartment in a controlled manner, at a reasonably predictable pre-determinable pressure, and in a manner which does not lead either to uncontrolled bursting of the packaging or to the potential for contamination with packaging or sealing debris. Further, it can be configured to work in such a manner that essentially all of the liquid component is transferred completely every time, with little residual loss.

Thus, all of the benefits of a single dual-use pouch which serves as a container during both storage and cooking are offered, but the pouch also offers the benefits of separate storage where this might be desirable, especially to separate a fluid component from a component which tends to deteriorate in presence of an excess of fluid.

In particular, keeping an excess of fluid out of the second compartment is likely to be beneficial for at least two reasons. First, it avoids the quality deterioration that is likely to happen in the presence of an excess of fluid with certain food ingredients, in particular starchy ingredients. Second, it might also confer food safety advantages. For practical purposes, many ingredients of the type it is envisaged to put in the second compartment will be relatively dry, and the relative low water activity (aw) will impede bacterial activity and prolong shelf life relative to the mixture. Many of the ingredients it is intended to put in the first compartment may have a high sugar or salt content, or low pH, which will also tend to reduce bacterial activity and prolong shelf life relative to the mixture. These additional 'hurdles' to the growth of food spoilage organisms or pathogens will aid in situations where the primary food safety control such as thermal processing sterilisation or pasteurisation has been compromised through pack integrity issues post processing.

The pouch is preferably so shaped and structured as to define by that structure a desired vertical direction in use during heating. For example, the pouch defines a lower portion, such as a bottom edge, and includes structural components by means of which the pouch is stably retained, and for example stands upon a surface, with this lower part lowermost during heating. Preferably, the pressure sensitive apertured portion is located towards this lower point, and for example in the vicinity of and preferably adjacent to, the said bottom edge.

For example, the pouch is provided in a suitable support container such as a carton which constitutes a flat surface engaging support means to retain the container during the heating process in such an upright position, or the pouch itself comprises such a support by means of a formed base portion, for example in that it has gusseted base in manner which will be familiar.

Preferably the closure seam runs generally vertically when the pouch is orientated in use in such a defined upright configuration. For example, the closure seam runs generally vertically from a base edge to a top edge, with the pressure responsive apertured portion located generally in the vicinity of the base edge.

The pouch preferably has a generally horizontal base edge, and in a particularly preferred embodiment is generally rectangular in profile.

With the pouch so orientated for heating that the separation seam runs generally vertically, with a first compartment on one side and a second compartment on the other, and with the pressure responsive apertured portion generally towards the bottom, the heating and transfer process is optimised. Typically, as will be familiar, an opening will be made in the second compartment as above described to open the second compartment to outside pressure, and to eliminate pressure build up in the second compartment during heating which remains therefore at ambient.

The package will then be heated in familiar manner. Typically, this will be in a microwave oven, but the invention is not necessarily limited by the mode of heating, which could also include applying external heat to the packaging, and in particular to a base region thereof, for example by standing in hot water, standing on a heated surface or otherwise.

As the contents are heated, vapour pressure builds up in the first compartment. A pressure differential is generated between the first and second compartment. The only release for this pressure is through the pressure sensitive apertured portion, and hence out of the opening in the second compartment. Typically, steam builds up in the uppermost part of the first compartment, and forces heated liquid component from the base of first compartment into the base of the second compartment. The cooking process therefore at least partly combines the elements of the meal product before serving and without the need for any external action to effect mixing.

Alternatively, the liquid component may be transferred by the application of pressure by, for example, hand in application where heating is not required or desired.

For serving, the second compartment is completely opened, and the heated/cooked meal may be tipped onto a serving plate or the product may be consumed from the pouch. A particular advantage of the geometry of this preferred embodiment is that the meal is thereby presented in a way which is usually considered desirable, with the sauce or like portion on top of a base made up of the product from the first compartment, which is for example rice, pasta or the like. Thus, where a food product includes a sauce or the like this is presented on top when the meal is placed on a plate, which is generally considered presentationally desirable.

In particular to exploit this, or for any other reason, the second compartment may contain more than one type of ingredient, successively positioned. For example, the first compartment may contain a sauce, and the second compartment may contain a vegetable portion or a dried product portion towards the bottom, and a rice or pasta or other starchy portion above it. The heating process in accordance with the invention will tend to cause the sauce to combine effectively with the vegetable or dried portion, to create a more palatable meal element, and present the meal element on top of the heated but still relatively dry pasta or rice portion.

The closure seam dividing the pouch into separate compartments may seal the opposed faces of the sheet material of the pouch together by any suitable mechanism. For example, the material may be adhesively bonded with a secondary material to bond the surfaces together, by virtue of some adhesive chemical reaction, by virtue of melt bonding or otherwise under application of heat, or by any combination thereof. The seal may be welded under pressure and/or temperature to fuse the material of the two opposing sheet faces together. Any other bonding technique may be used provided that the resultant seal is stable at the designed operating temperatures, which will include for example the designed consumer reheat temperature and where applicable the retort or other sterilisation temperature at the manufacturing stage.

The key to the invention is the provision of a controlled and carefully located pressure sensitive apertured portion of the closure seam, so structured and configured as to be closed at ambient pressure or where there is no significant pressure differential between compartments, but tend to open at a predetermined pressure differential between compartments, for example when the pressure in one is at ambient and in the other at greater than ambient, and thus intended to open as overpressure builds in the first compartment during heating.

In a first embodiment, this pressure sensitive apertured portion comprises a zone of weakness in the seal between sheet faces. For example, in the zone of weakness the seal is bonded with a less strong adhesive, or is bonded with an adhesive material that is designed to fail at the predetermined pressure, or is less strongly welded or otherwise joined so as to fail at the predetermined pressure.

In a particularly preferred variant of this concept, there is no structural seal at all between the sheet faces in the region of the pressure sensitive apertured portion, in that this region is an unbonded zone in the seam, but the material of the pouch comprises a material having at least a degree of flexible resilience and the pouch is so structured that the opposing surfaces of the sheet material in the pressure sensitive apertured portion of the closure seam tend to be urged together by the structure to tend to close the gap between them at ambient pressure/low pressure differential, but allow a gap to be forced open at a predetermined overpressure. With careful control of the bag structure, and in particular by in effect maintaining a small degree of tension to hold the two surfaces together in the vicinity of the pressure sensitive apertured portion, a structure can be produced which requires no additional sealing material, which therefore completely eliminates the risk of seal material contamination or uncontrolled bursting, but which nevertheless constitutes a sufficiently effective seal under ambient pressure negligible overpressure and normal handling conditions to minimise the transfer of material between the two compartments until the pouch is heated and pressure caused to build to a significant level in the first compartment to create the predetermined overpressure.

This variant may additionally be made even more effective by folding the two sections through 90 to 180° or by the use of an external clip.

For the reasons set out above, an absolute seal is not a necessary requirement, since the invention is directed primarily at a food quality problem and not at an absolute food hygiene problem. It is only necessary to have a closure that is largely effective at substantially equalised pressure but open at the desired overpressure.

In accordance with a further embodiment, the pressure sensitive apertured portion comprises a pressure valve, and in particular a mechanically actuated pressure value, located in a gap within the closure seam so as to effect closure of the gap when the valve is closed, but to constitute an aperture to permit fluid communication between the first compartment and the second compartment when the valve is open. A valve might be considered where it is perceived to be more important to prevent even minor levels of transmission of fluid from the first compartment to the second compartment prior to heating. Again, the valve is opened at a predetermined differential pressure, e.g. a predetermined overpressure in compartment one relative to an ambient pressure in compartment two.

The sheet material of the pouch comprises flexible food grade material selected to be stable at operational temperatures, such as consumer re-heating temperatures and sterilisation retort temperatures. In accordance with the preferred mode of heating the packaged product, the material is preferably microwave stable. The material is conveniently a flexible polymeric sheet material such as will be familiar from conventional pouches. The polymeric sheet material may be transparent, coloured or printed with design, or in any combination, and will tend to be a laminate of various films chosen to give the required strength appearance and barrier properties as is well known in the industry.

A pouch of the invention may be fabricated from a single sheet of material, suitably folded and sealed to form the required enclosure, or from paired opposing sheets of material suitably sealed to form such an enclosure. Various conventional techniques are known for the production of such pouches, and in particular for the continuous production of such pouches from one or two continuous webs of suitable polymeric material. For example, processes are known for folding a continuous web of material into two side walls with a bottom gusset extended therebetween in a generally W shape to serve as a base in use. Such known processes are suited to the fabrication of a pouch in accordance with the invention, subject only to the necessary modification also to add the intermediate seam and transfer apertures. Preferably, such a known process is employed, and an intermediate seam is incorporated, for example by heat sealing, during use. Pre-made pouches made to this design may be filled and sealed on conventional machines, suitably modified for the two or more compartments.

In accordance with a further aspect of the invention, a method of filling packaging with food product comprises the steps of providing a packaging pouch in accordance with the first aspect of the invention above described, and in particular fabricating such a packaging pouch by folding and heat sealing polymeric material from a continuous web; and partially closure sealing to retain fill apertures in each compartment; filling a first compartment of the pouch with a first food product having an excess of fluid, and for example an excess of liquid such as water; filling a second pouch with a food product such as to deteriorate in quality when stored with an excess of fluid and in particular an excess of liquid such as water; completing the enclosure seal of the same by sealing the material at the full apertures.

For example, the original fabrication process leaves an upper portion of the pouch, and for example a top edge of a generally rectangular pouch, open as a fill aperture prior to filling with food product, this upper portion and for example top edge being sealed as a subsequent process step.

Preferably, initial pouch formation, filing and eventual closure are combined as an inline process on what is conventionally known as 'form, fill and seal' (ffs) machinery.

The pouch is typically cold filled with food product before sealing. To extend shelf life, the food product may be pasteurised or sterilised after sealing, for example in a suitable retort, to allow it to be stored at room temperature, or may be chilled or frozen. Additionally or alternatively, improved shelf life may be obtained in that the food product in the second compartment is dried, the low water activity giving shelf life. The fluid food product in the first compartment may get shelf inherently by virtue of its low pH or other compositional ingredients, or by addition of chemical preservatives. Alternatively one or more compartments may be aseptically filled to give the required shelf life.

A pouch in accordance with the invention comprises at least one pouch compartment for a fluid product, and at least one pouch compartment for a food product to be kept separate therefrom, together formed as a pair with a common seam seal and a pressure sensitive apertured portion tending to keep the compartments separate during storage, but allowing the fluid component to move into the other compartment under the pressure differential generated during heating or by external pressure. The invention encompasses pouches with more than these two compartments. For example, a single pouch may comprise more than one such pair of first and second compartments, each containing different ingredients for a meal product, or for different parts of a meal. Additionally or alternatively third compartments may be defined by further separation seams which are fully sealed and designed to remain separate both during storage and during cooking. Multiple different ingredients can be cooked together in this way, and kept separate either just during storage, or during both storage and cooking as desired, while retaining the practical advantages and convenience of single pouch technology.

BRIEF DESCRIPTION OF THE DRAWINGS

The invention will now be described by way of example only with reference to the accompanying Figures, in which:

FIGS. 1A to 1C respectively show an embodiment of a pouch in accordance with the invention at three stages in the process. In FIG. 1A, a pouch is shown after initial formation but prior to filling with food product. In FIG. 1B, a pouch is shown after filling with food product and completion of the seal. In FIG. 1C, a pouch is shown being heated.

DETAILED DESCRIPTION OF THE INVENTION

Figure 1A:
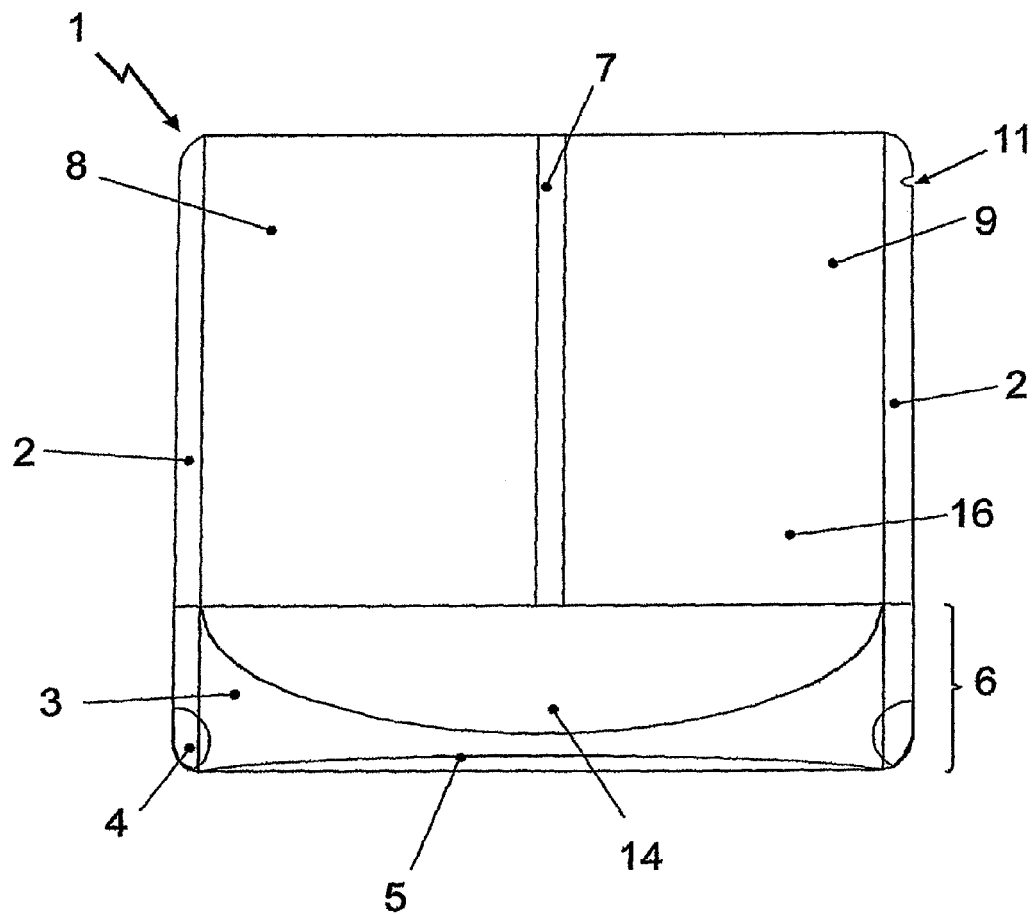
FIGS. 1A-1C show an embodiment of pouch in accordance with the invention in side elevation at various stages of operation.

Referring first to FIG. 1A, a pouch is shown having been formed initially from laminated PET film/Ink/adhesive/OPA film/adhesive/CPP film. The pouch (1) is generally rectangular in shape and consists of a pair of opposing polymeric sheet portions (for example separate sheets or a folded single sheet) bonded along both common longitudinal edges (2) and further bonded along a bottom edge region (3) which serves as the base in use. The bonded zones (2, 3) define and partially enclose a containment volume into which food product can be introduced for containment.

The base (5) of the pouch (1) is formed into a gusseted region (6) in a manner which will be familiar from conventional pouch designs. The gusseted region opens out so that the base can serve as stand in use, and both leaves of the gusseted region are bonded in the vicinity of the bottom edge by the sealed area (3).

Conveniently, the pouch (1) may be fabricated from a single continuous web of suitable polymeric material in familiar manner. A length of sheet from the continuous web is folded into a "W" shape, with the long arms of the W forming the opposite sheets making up the main body of the pouch and the short arms of the W forming the gusseted region. Adjacent sheet portions are thermally welded together in the regions of the seals (2, 3) to effect the partial enclosure. The two bonded pairs of sheets thus created in the gusseted region by the seal (3) are then themselves bonded together by sealing the adjacent external surfaces via the welded seal (4). Successive pouches can be created in train from a single web in this way in a manner which will be familiar. However the invention is not limited by method of manufacture of the pouch, or by the bonding technique used to effect the seals (2, 3) and the foregoing is for illustration only.

The significant characterising feature of the invention is the additional seal (7), conveniently formed in like manner to longitudinal seals (2), which extends generally parallel to those seals from the top of the pouch to the beginning of the gusseted region (6). This intermediate seal (7) divides the containment volume into two distinct compartments, a first compartment (8) and a second compartment (9).

A small tear initiator (11) is provided in the edge seal (2) of the second compartment (9). This extends only partly into the width of the seal, so that it does not compromise the integrity of the seal, but enables the compartment (9) to be torn open for use (refer to description of FIG. 1C).

The partly formed pouch is now ready for filling. In the preferred embodiment, filling with food product and subsequent sealing takes place on an in-line apparatus subsequent to the partial forming of the pouch as illustrated in FIG. 1A. This is particularly the case in relation to the preferred application of the invention to produce a retortable pouch, which is suitable for subsequent sterilisation in a retort or other heat sterilisation means after filling with food product. The retorting process again preferably takes place via an in-line apparatus as will be familiar. However, the invention is not limited to pouches for packaging for retort or other sterilisation, but also to pouching food product which is preserved by chilling, freezing, drying or any other suitable process, or for any application where it might be desirable to store a food product in a compartmentalised manner to keep a fluid component away from another component.

Figure 1B:
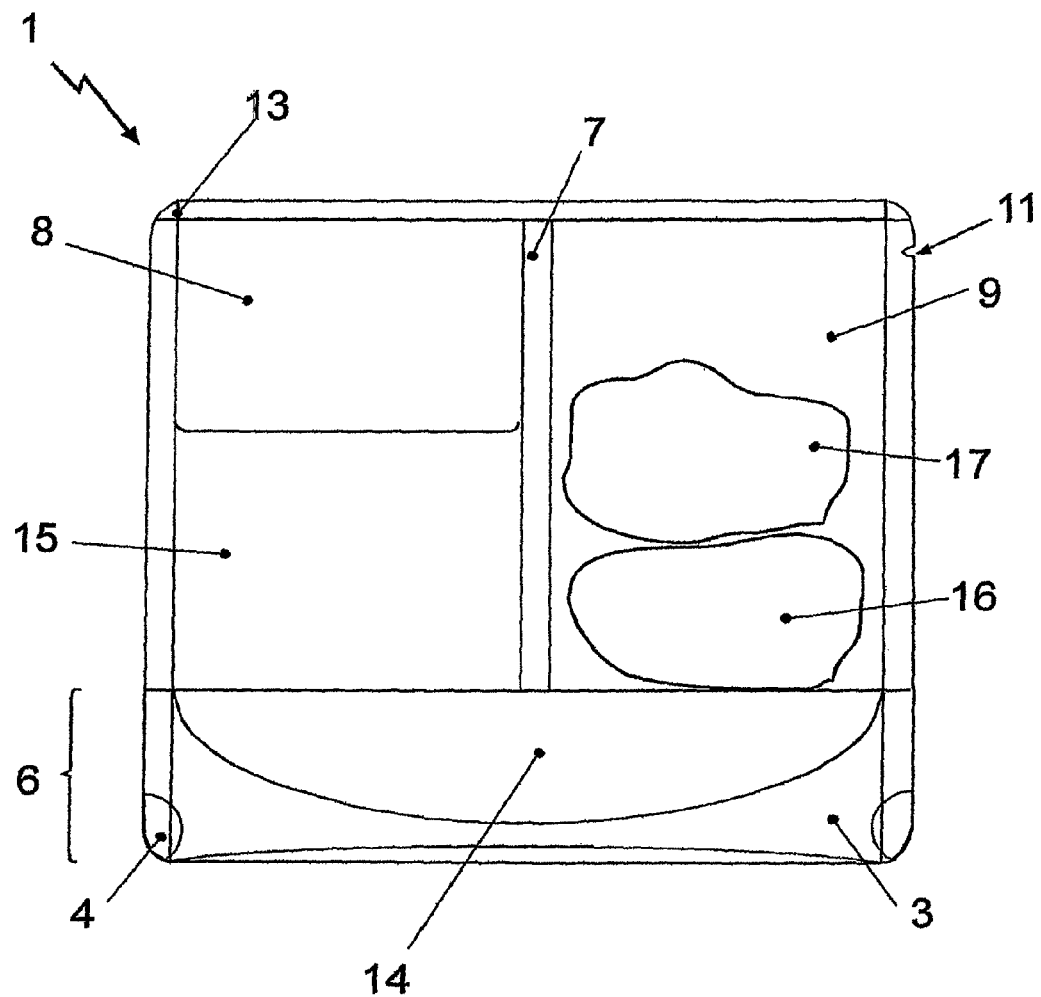

The filled pouch is illustrated in FIG. 1B. A liquid sauce product (15) has been introduced into the first compartment (8). Two solid products (16, 17) have been introduced into the second compartment (9). To exploit the advantages of the invention to the full, at least one of the solid products will typically be a product that is likely to deteriorate in quality, and for example become soggy, if introduced too early to the sauce product. Additionally or alternatively, a solid product might be a dried (that is, dried specifically for preservation) ingredient. In the illustrated embodiment, by way of example, food product (16) is a vegetable serving and food product (17) is a rice serving. Sauce product (15) may consist purely of a fluid sauce component (being a liquid, emulsion, suspension etc) or may include solid product, for example or other meat pieces.

Once filled with food product, the pouch seal is completed by means of the heat seal (13) across the top. The pouch may then be optionally sterilised, for example in a retort, and is then ready for onward handling and storage.

It is at this point that the significance of the structure of the intermediate seam seal (7) should become apparent. The seam (7) extends only to the beginning of the gusseted portion (6). This leaves an unsealed region (14) in the gusseted portion (6).

The geometry of the pouch and the properties of the flexible polymeric material from which it is made is such that, particularly in the filled state, the paired opposing sheets making up each leaf of the gusseted portion (6) in the unsealed region (14) are urged together to complete a closure that fluidly isolates the first compartment (8) from the second compartment (9). This closure is sufficient for practical purposes to prevent or at least substantially hinder mixing of the sauce with the other ingredients during transit and storage where there is no or little pressure differential at the unsealed region. As discussed previously, a small degree of mixing is not necessarily disastrous. Therefore for most purposes this simple arrangement is sufficient, and there is no need to provide a further closure, for example in the form of additional weakened seal to give a zone of weakness in the area (14) or in the form of a specific valve mechanism. Such options might be considered in certain applications.

Figure 1C:
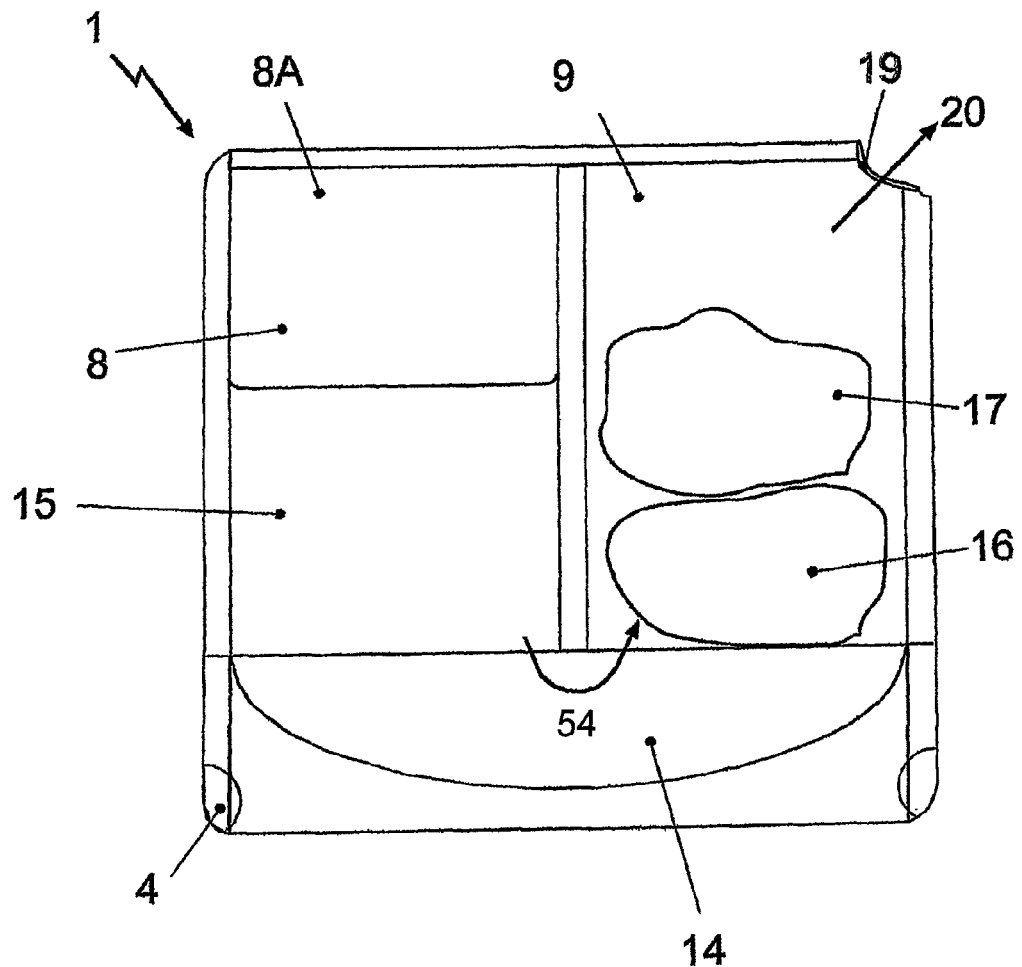

The sauce ingredient (15) is thus kept substantially separate from the solid ingredient, (16, 17) with the attendant potential advantages regarding product quality and product hygiene over a period of product shelf life. However, when the time comes to heat the pouch to serve the food product as a meal, the pouch structure facilitates the mixing of the ingredients. This is illustrated in FIG. 1C.

Before heating, a tear is made to expose the second compartment to an external atmosphere by means of the cut (11). In the example, an entire corner has been removed exposing the hole (19). The pouch is then heated, for example in a microwave.

Initially, the food product in both compartments heats in conventional manner. However, as the sauce product (15) becomes hotter, pressure tends to build in the still sealed first compartment (8), in particular by the generation of steam which collects in an upper part (8a) of the first compartment (8). The outlet at the tear however keeps the second compartment at or about ambient pressure. This generates an overpressure in the first compartment relative to the second.

As this overpressure builds, there can be only one outlet. Once the pressure differential is sufficient to force apart the opposing sheet surfaces in the unsealed zones (14) within the leaves of the gusset (6) the overpressure can only be released through the unsealed zone in the direction of the arrow 54 and ultimately out to atmosphere via the aperture created by the tear (19) in the direction of the arrow (20). In consequence, sauce product (15) is forced in the direction of the arrow 54 into the dry food product in the second compartment (8, 9).

Figure 2:
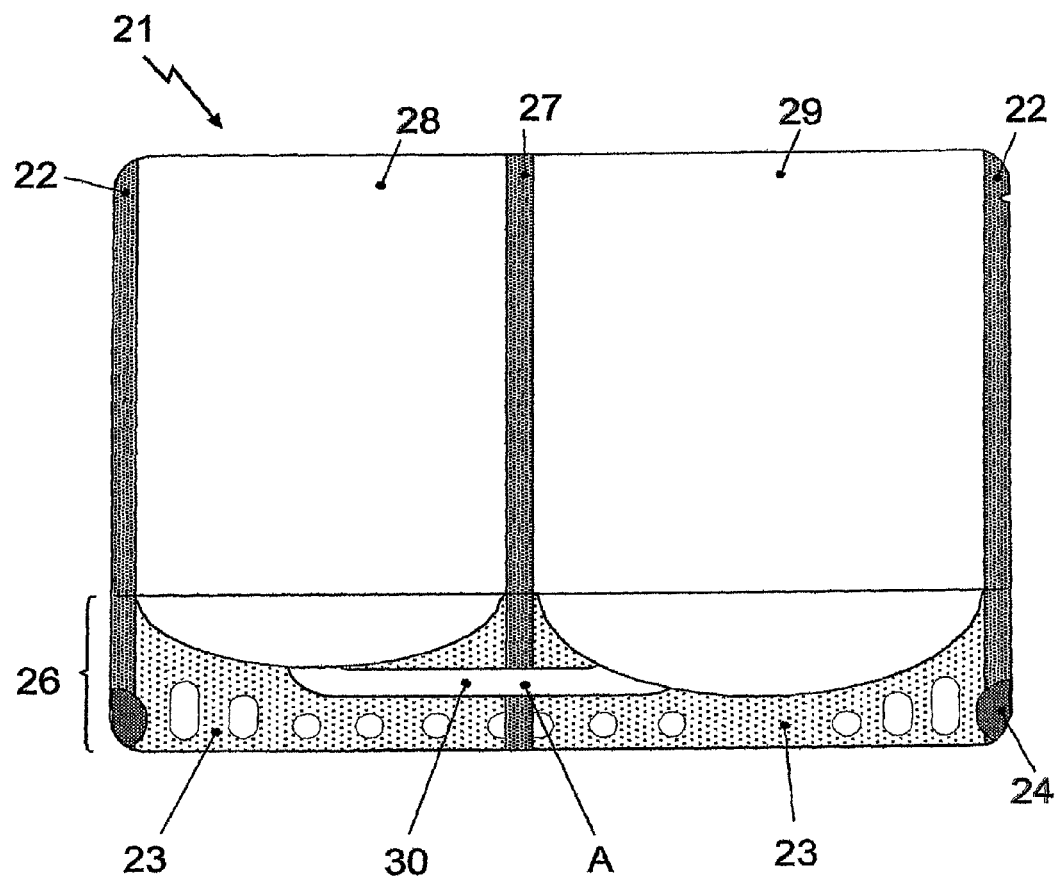
FIG. 2 shows an alternative embodiment of pouch.

An alternative embodiment of pouch in accordance with the invention is shown in FIG. 2. In this instance, the pouch is illustrated in the unfilled state only, and FIG. 2 is thus equivalent to FIG. 1A.

Again, the pouch (21) is formed from sheet polymeric material to have a generally rectangular shape. The pairs of sheets are bonded along both common longitudinal edges (22) and in a bottom edge region (23) which serves as the base in use to define a closure volume. Each resultant bonded pair in the gusseted region is then further sealed to the other pair by means of the seal (24).

Again, an additional longitudinal seal (27) divides the containment volume into two distinct compartments, a first compartment (28) and a second compartment (29).

The embodiment differs in the detail of how a selectively closeable under pressure communication path is provided between the two compartments (28, 29). Unlike the embodiment illustrated in FIG. 1, the seal (27) extends the full length of the pouch (21), and in particular extends into the gusseted region (26). However, a deliberately unsealed channel (30) is left extending across the otherwise sealed portions (23,27) in the gusseted region (26).

Again, the pouch is so structured that this unsealed channel nevertheless serves as an effective means to isolate the contents of the two compartments (28, 29) in a normal state where there is essential pressure equivalence between the two compartments. For example, it is so structured that the facing sheets in this region tend to sit closely together and require some applied pressure differential to force them apart. In this way, the two compartments (28, 29) remain substantially isolated, at least sufficiently for practical purposes, during transit and storage once they are filled, but the channel (30) provides a fluid communication between the two compartments during heating in the same manner as before, in that compartment (29) is opened to the atmosphere, and an overpressure builds up in compartment (28) which eventually reaches a point where it forces apart the sheets in the region of the channel (30) allowing the material to pass under pressure into the compartment (29).

Figure 3:
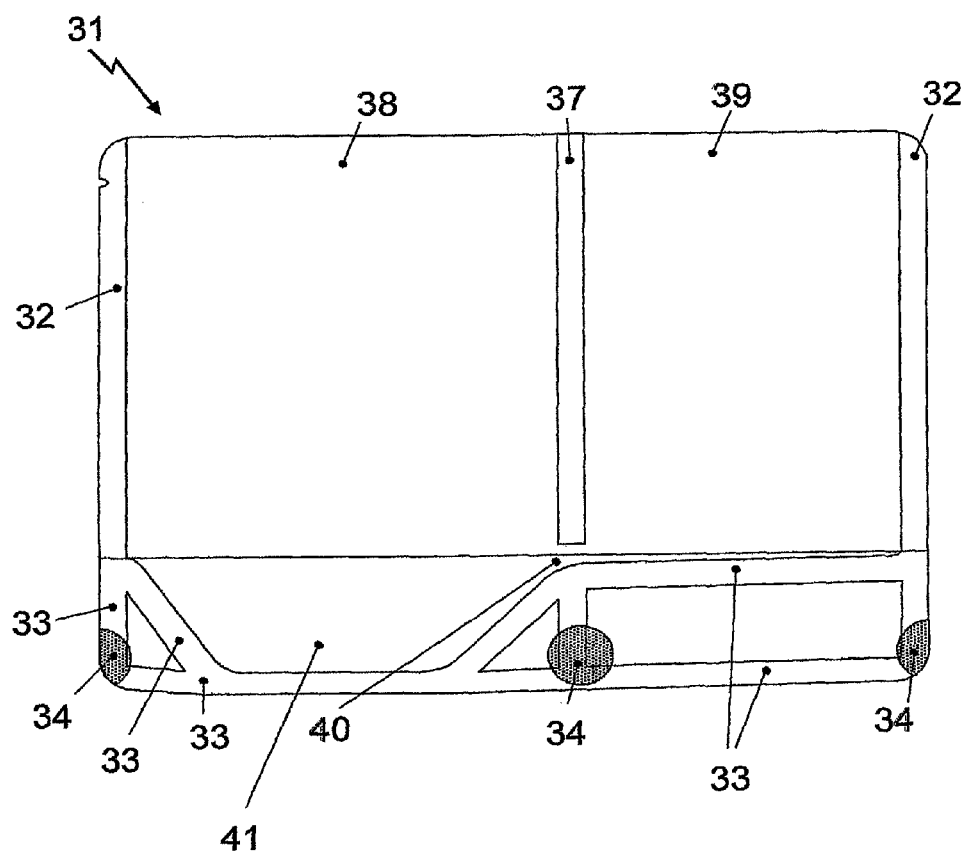
FIG. 3 shows a further alternative embodiment of pouch.

An alternative embodiment of pouch in accordance with the invention is shown in FIG. 3. Again the pouch is illustrated in a unfilled state only, and FIG. 3 is thus equivalent to FIG. 1A.

Again, the pouch (31) is formed from sheet polymeric material to have a generally rectangular shape. Pairs of adjacent sheets are bonded along both common longitudinal edges (32) and in a bottom edge region (33) with additional seals between bonded pairs of sheets (34) completing the gusset structure which serves as a base in use. An additional longitudinal seal (37) is once more provided to divide the volume into a first compartment (38) and a second compartment (39).

In the case of this embodiment, the lower seals (33) leave a deliberately unsealed channel (40) in communication between the second compartment (39) and the gusseted region (41) of the first compartment (38). Again, the pouch is so structured that this unsealed channel nevertheless serves as an effective means to largely isolate the contents of the two compartments (38, 39) in a normal state where there is essential pressure equivalence between the two compartments, but to allow material to pass under an overpressure during heating from compartment (39) to compartment (38).

In this way, in any of the illustrated embodiments, mixing can take place between product in each compartment, but only (or at least, largely only) at the point of cooking. Dry ingredients can be stored in the second compartment which might be of a type that would degrade through prolonged contact with the sauce during storage, or might even be deliberately dried as preservation technique, but which rehydrate or otherwise mix with the sauce during the cooking process. Thus, the invention combines the benefits of separate storage with single mixed cooking in a single pouch.

If a valve or external clip is used to aid separation it will be fitted generally at the point marked A.

Figure 4:
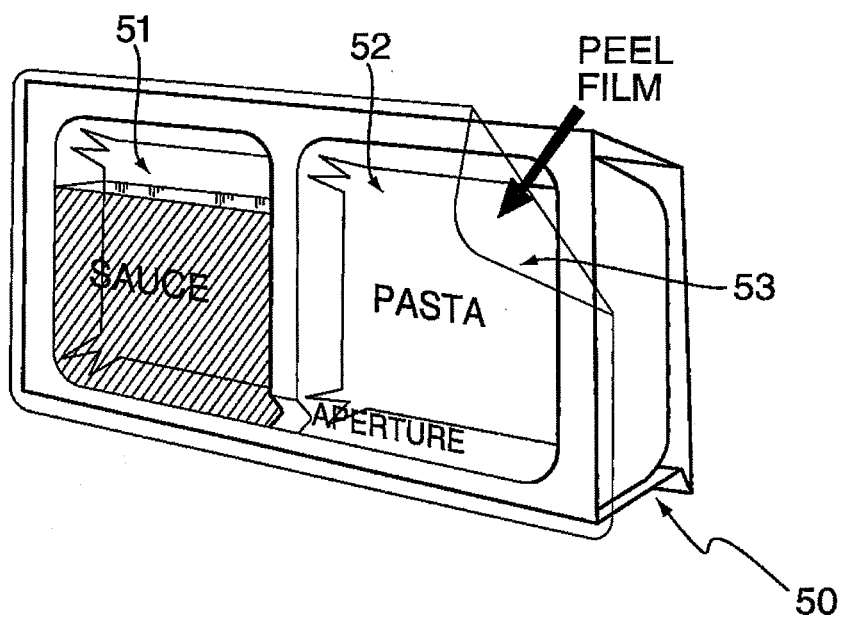
FIG. 4 shows an embodiment of a pouch in the form of a tray.

In a further embodiment of a pouch shown in FIG. 4, the pouch (50) is configured having the two compartments (51,52) formed into a tray enabling the pouch (50) to be used as a plate or bowl in which the contents are retained during consumption.

During storage the open side of each compartment (51,52) is sealed over by a peelable film (53). As with the previously illustrated embodiments, contents retained in the two compartments (51,52) are substantially isolated from one another in that they are linked only by means of a closed channel, which channel is openable under the pressure differential, caused for example by heating.

The invention claimed is:

1. A method of heating food product contained within a pouch container, comprising the steps of:

providing a pouch container for storage and heating of a food product comprising a sheet containment material comprising, a pair of resiliently flexible mutually-opposing surfaces which are peripherally sealed together to define a pouch container having a food containment volume there-between and having a top edge and an opposite bottom edge by which said pouch container is supported in a stable, upright vertical orientation upon a surface, with said bottom edge being the lowermost portion of said pouch container during heating; and at least one closure seam provided within said food containment volume between said pair of mutually-opposing surfaces of said sheet containment material to divide said food containment volume into a first food compartment and a second food compartment with both compartments containing food product for storage and heating, wherein said second food compartment has a manually openable portion disposed generally adjacent to said top edge, which is opened prior to heating to break said peripheral seal of said second food compartment and permit an external atmosphere to freely enter and exit said second food compartment and cause said second food compartment to remain at ambient pressure during heating, and said at least one closure seam extends generally vertically and substantially the length of said food compartment containment volume and disposed above a pressure sensitive apertured portion that is adjacent said bottom edge of said pouch container when said bottom edge of said pouch container is positioned upon a surface and said pouch container is in an upright, vertical orientation, and said pressure sensitive apertured portion comprises said pair of resiliently flexible mutually-opposing surfaces, and said pair of resiliently flexible mutually-opposing surfaces are urged together at said pressure sensitive apertured portion such that said pressure sensitive apertured portion is configured and dimensioned to be closed when said first and second food compartments are at ambient pressure, configured and dimensioned to open when said openable portion of said second food compartment is open and at ambient pressure and said first food compartment is at a predetermined pressure greater than said ambient pressure, and is configured and dimensioned to close once a predetermined pressure differential between said first and second food compartments ceases;

opening manually said manually openable portion of said second food compartment prior to heating, by breaking said peripheral seal of said second food compartment and permitting said external atmosphere to freely enter and exit said second food compartment, thus resulting in the second compartment being at ambient pressure;

heating said pouch container to cause said pressure in said first food compartment to rise to said predetermined pressure greater than said ambient pressure;

maintaining said second food compartment at ambient pressure during heating, as a result of said opening of said manually openable portion permitting said external atmosphere to freely enter and exit said second food compartment;

opening said pressure sensitive apertured portion, during said heating, due to a pressure differential between said second food compartment at ambient pressure and said first food compartment at said predetermined pressure greater than said ambient pressure, wherein the opening of said pressure sensitive apertured portion during heating transfers completely the contents of the first compartment into the second compartment; and after said heating the predetermined pressure differential between said first and second food compartments ceases and said pressure sensitive apertured portion, returns to being urged together and closed due to the resiliency of the mutually opposing surfaces.

2. The method according to claim 1, further comprising the step of:

positioning said bottom edge of said pouch container upon a surface prior to heating, to support said pouch container in a stable, upright vertical orientation upon the surface, with said bottom edge located lower than the other edges of said pouch container and with said pressure sensitive aperture portion located immediately above said bottom edge.

3. The method according to claim 1, wherein:

said manually openable portion is a member selected from the group consisting of a removable flapped aperture and a kiss cut tear.

4. The method according to claim 1, wherein:

said pair of resiliently flexible mutually-opposing surfaces of said sheet containment material in said pressure sensitive apertured portion of said closure seam comprises an unbonded portion of said closure seam which is urged together to close a gap between said mutually-opposing surfaces at ambient pressure and allows said gap to be forced open during said opening of said pressure sensitive apertured portion.

5. The method according to claim 1, wherein:

said mutually-opposing surfaces each have a peripheral edge and are peripherally sealed together along the entire length of said peripheral edges, prior to opening said manually openable portion.

\* \* \* \* \*